United States Patent
Greer et al.

(10) Patent No.: US 11,332,261 B2
(45) Date of Patent: May 17, 2022

(54) ANTI-SKID HIGH RETROREFLECTIVITY PREFORMED THERMOPLASTIC COMPOSITES FOR RUNWAY APPLICATIONS

(71) Applicants: Robert W Greer, Lexington, NC (US); Simon Yakopson, Hickory, NC (US); Catherine Binder, High Point, NC (US)

(72) Inventors: Robert W Greer, Lexington, NC (US); Simon Yakopson, Hickory, NC (US); Catherine Binder, High Point, NC (US)

( * ) Notice: Subject to any disclaimer, the term of this patent is extended or adjusted under 35 U.S.C. 154(b) by 0 days.

(21) Appl. No.: 15/670,203

(22) Filed: Aug. 7, 2017

(65) Prior Publication Data

US 2018/0080185 A1 Mar. 22, 2018

Related U.S. Application Data

(62) Division of application No. 13/240,209, filed on Sep. 22, 2011, now Pat. No. 9,765,489.

(51) Int. Cl.
*B64F 5/00* (2017.01)
*B64F 1/00* (2006.01)
(Continued)

(52) U.S. Cl.
CPC ............... *B64F 1/00* (2013.01); *B64F 5/40* (2017.01); *E01F 9/512* (2016.02); *Y10T 156/10* (2015.01)

(58) Field of Classification Search
CPC .... B64F 1/00; B64F 5/40; E01F 9/512; E01F 9/50; E01F 9/506; E01F 9/524; Y10T 156/10
See application file for complete search history.

(56) References Cited

U.S. PATENT DOCUMENTS 2,897,733 A 8/1959 Shuger
4,690,958 A 9/1987 Lacoste et al.
(Continued)

FOREIGN PATENT DOCUMENTS

CA 2794647 10/2018
DE 10044300 4/2002
(Continued)

OTHER PUBLICATIONS

"CCS (TM) Binder, Polyurea Primer"; ChemCo Systems; Publication No. 3EPCCS-141.
(Continued)

*Primary Examiner* — Nancy R Johnson
(74) *Attorney, Agent, or Firm* — Kilpatrick Townsend & Stockton LLP

(57) ABSTRACT

Disclosed is an alkyd or hydrocarbon resin-based pre-manufactured thermoplastic airport runway signage that is applied in relatively large sections onto an airport runway where the alkyd or hydrocarbon resin-based composite includes a functionalized wax incorporated in the resin-based composite within the range of 0.2 to 3 percent by weight, thereby allowing the resin-based composite to exist in a molten state within a viscosity range of between 35,000 and 85,000 centipoise and wherein the top surface provides an area for surface indicia materials existing on the top surface together with retroreflective glass beads with an index of refraction of 1.9 such that when the beads are suspended in and applied on the surface of the resin-based composite in a molten state the beads do not sink into the resin-based composite provide for allowing and maintaining an overall retroreflectivity of about 1000 millicandellas/m$^2$/lux (mcd).

17 Claims, 2 Drawing Sheets

(51) Int. Cl.
*E01F 9/512* (2016.01)
*B64F 5/40* (2017.01)

(56) References Cited

U.S. PATENT DOCUMENTS

| | | | |
|---|---|---|---|
| 5,288,163 | A | 2/1994 | Munson |
| 5,973,028 | A | 10/1999 | Maxwell et al. |
| 6,350,823 | B1 | 2/2002 | Goeb et al. |
| 7,175,362 | B2 | 2/2007 | Carr et al. |
| 7,744,306 | B2 | 6/2010 | Greer et al. |
| 2002/0099218 | A1 | 7/2002 | Sassi et al. |
| 2003/0012599 | A1* | 1/2003 | Wallgren ................ E01F 9/512 404/14 |
| 2003/0070579 | A1 | 4/2003 | Hong et al. |
| 2003/0123932 | A1 | 7/2003 | Khieu et al. |
| 2005/0100709 | A1 | 5/2005 | Bescup |
| 2005/0245642 | A1 | 11/2005 | Senturk |
| 2006/0074171 | A1 | 4/2006 | Bach et al. |
| 2008/0280034 | A1* | 11/2008 | Mathis ................ C03C 3/125 427/137 |
| 2009/0105407 | A1 | 4/2009 | Karjala et al. |

FOREIGN PATENT DOCUMENTS

| | | |
|---|---|---|
| EP | 1270820 | 1/2003 |
| JP | 11209909 A2 | 8/1999 |
| WO | 9828372 A1 | 7/1998 |
| WO | 0142349 | 6/2001 |

OTHER PUBLICATIONS

Polyurea Primer; MSDS Publication Date: Dec. 1995.
Federal Specification Sheet # TT-B-1325D "Beads (Glass Spheres) Retro-reflective" Aug. 6, 2007.
BR 112013013456-9, Office Action, dated Nov. 10, 2020, 4 pages.

* cited by examiner

ANTI-SKID HIGH RETROREFLECTIVITY PREFORMED THERMOPLASTIC COMPOSITES FOR RUNWAY APPLICATIONS

PRIORITY

This application is a divisional of and takes priority under 35 USC 120 from U.S. patent application Ser. No. 13/240,209 filed on Sep. 22, 2011 and entitled "Anti-Skid High Retroreflectivity Preformed Thermoplastic Composites for Runway Applications", the entire contents of which are hereby incorporated by reference.

FIELD OF INVENTION

The present invention relates to preformed thermoplastic surface guidance indicia that are applied to runways and taxiways to convey information to aircraft and aircraft support operators. More specifically, the invention involves the additional features of high retroreflectivity and anti-skid properties while maintaining the necessary bonding characteristics to ensure the indicia is properly adhered to the runway and taxiway surfaces.

BACKGROUND OF INVENTION

Airport pavement indicia and signs provide information that is useful to a pilot during takeoff, landing, and taxiing. Generally airport indicia are grouped into four categories: runway indicia, taxiway indicia, holding position indicia, and other indicia. Indicia for runways are white. Indicia for taxiways, areas not intended for use by aircraft (closed and hazardous areas), and holding positions (even if they are on a runway) are yellow. Indicia for heliports are white with the exception of medical helicopter areas which are white with a red cross.

Presently much of the runway and taxiway information is painted onto the concrete or asphalt. This paint may last for several weeks or several months depending on the amount of use, the size of the aircraft traffic using it and/or severity of environmental conditions.

It has been found that uniformity in airport indicia and signs from one airport to another enhances safety and improves efficiency. FAA Standards AC 150/5340-1 "Standards for Airport Indicia" and AC 150/5340-18 "Standards for Airport Sign Systems" are both references that define the minimum requirements for airport indicia and signage. Non-maintenance of painted indicia may allow indicia to become deteriorated to a point where the information being conveyed is confusing or illegible.

Runway indicia may also be divided into the following groups: visual runway indicia, non-precision instrument indicia and precision instrument indicia. Additional indicia are required for runway lengths over 4000 feet and for runways serving international commercial transports.

Maintenance of the painted surfaces require that runways and taxiways be shut down while the surface is prepared, paint applied and for curing time. Maintenance of a particular runway may impact the holding and taxiways of adjacent or intersecting pavement. The pavement warnings of adjacent or intersecting pavement must change to denote changes in holding areas, and thresholds to avoid ground collisions with other aircraft.

Presently many airports have allocated budgets for painting the warning, identification and directional indicia. Painting the runway surfaces is performed on a rotational basis of about every three weeks depending on the volume and size of the aircraft traffic. Although the painting of the runway surface is relatively quick, the runway traffic needs to be rerouted to other runways causing flight delays while the painting and drying of the painting occurs. It also is expensive in that full time painting crews are continually rotating from runway to runway.

Ground safety remains a problem at busy airports across the United States and the world. The movement of aircraft in and around busy airports along taxiways between terminal gates and runways presents numerous opportunities for runway incursions, particularly when visibility is poor. A runway incursion is the entry of an aircraft without clearance onto an active runway from an adjacent ramp or taxiway, for which there is a great deal of risk of collision with a landing or departing aircraft. Incursions are often the inadvertent result of pilot disorientation caused by poor visibility.

As recently as Aug. 26, 2006, Comair Flight 5191 crashed about half a mile past the end of a runway at the Lexington, Ky. airport, killing 49 of the 50 people onboard. The plane took off on runway 26, not runway 22 where it was assigned. It was an early morning flight with overcast skies and a slight rain. The NTSB probe is focusing their investigation on recent construction work at the Lexington airport, lighting and the indicia on the taxiways and runways.

This does not include incidents such as taxiway collisions or near misses resulting from vehicle operators mistaking one taxiway for another. Runway incursions and other taxiway incidents can still represent inconvenience and expense even when a ground collision does not result. To return an aircraft to a path from which it has strayed requires a considerable expenditure of time and fuel, and a compromise to the safety of all involved.

In addition to the need for runway signage that is relatively simply and quick to apply and that exhibits exceptional wear characteristics as well as allowing for delayed intervening scheduled maintenance, thereby assisting with the reduction of the cost of maintenance, delayed flights and confusion due to runway rerouting, the signage should also be highly retroreflective and skid resistant.

Specifically, the need for high retroreflectivity nighttime visibility has been increased to near or about 1000 millicandellas/m$^2$/lux (mcd) and this high retroreflectivity requires glass beads that must remain at or near the top surface of the signage to ensure that the retroreflectivity is maintained during and after installation. To create the proper composition requires a specific composition of the alkyd-based preformed thermoplastic composite which is one embodiment of the present disclosure.

DESCRIPTION OF RELATED ART

U.S. Pat. No. 7,744,306 to Greer, et. al., is hereby incorporated by reference and describes an alkyd resin-based pre-manufactured thermoplastic airport runway signage that is applied in relatively large sections onto an airport runway. The pre-manufactured preformed thermoplastic formed as a continuous sheet and wound onto a take-up spool. The runway surface is prepared with a two part primer with a viscosity in the range of 1-300 cps at room temperature and the preformed thermoplastic is unwound from the take-up spool and positioned onto the runway surface.

U.S. Pat. No. 7,175,362 to Carr et. al., and unassigned describes a runway/taxiway system comprising a synthetic covering securely installed to an anchor positioned against but not attached to a runway/taxiway so that an edge of the covering is adjacent to an edge of the runway/taxiway and a growth retarding base placed beneath the synthetic covering and along a second side of the anchor with the base holding the anchor against the runway/taxiway.

U.S. Pat. No. 5,288,163 to Munson, William D, and unassigned describes a method for identifying airport taxiways and taxiway intersections by indicia a first taxiway with a continuous elongated row of first indicia identifying the first taxiway and indicia the first taxiway with a continuous elongated row of second indicia identifying an intersection with a runway or second taxiway beginning at least 100 feet in advance of the intersection. The spacing between the second indicia decreases with proximity to the intersection indicia the intersection along the route to be traversed between the first taxiway and the runway of second taxiway with a row of second indicia and indicia the runway or second taxiway with a row of second indicia after the intersection. The spacing between the second indicia increases with proximity to the intersection and said row of second indicia extends substantially along the centerline of the runway or second taxiway.

U.S. Patent Application No. 2003/0070579A1 (abandoned) to Hong, et. al., and unassigned describes a pavement indicia construction comprising a flexible layer with top and bottom surfaces. The top surface of the flexible layer is adapted for vehicular and pedestrian traffic with the flexible layer comprising at least one thermoplastic elastomer, at least one resin and a wax. The resin is substantially miscible with the thermoplastic elastomer upon cooling from a molten state and an adhesive lower layer adjacent the bottom surface of the flexible layer is adapted to adhere the flexible layer to a pavement surface.

WIPO Publication No. WO9828372A1 to Rogers, Barry Heith, and unassigned describes an indicia composition comprising a binder component and a reflective component comprising thin sheets or pieces of material which are essentially reflective.

Japanese Publication No. JP11209909A2 to Fikute, et. al., and assigned to Port & Harbour Res Inst Ministry of Transport describes a paving structure for paving an airport and its construction method which is excellent in torsion resistance, and dispenses with the provision of a joint and heating in the case of execution. A room temperature asphalt mixture including an aggregate, an asphalt emulsion mixed with the aggregate in a state where a volume is increased by bubbling and a hydraulic setting inorganic material is paved, and after paving, a thermoplastic high-molecular polymer is supplied on the room temperature asphalt mixture and rollingly pressed to form a surface layer integrated with the paved room temperature asphalt mixture. Thus, a paving structure for paving an airport constructed in this way can be provided.

SUMMARY OF THE INVENTION

Specifically, the need for high retroreflectivity nighttime visibility has been increased to near or about 1000 millicandellas/m$^2$/lux (mcd) and this high retroreflectivity requires glass beads that must remain at or near the top surface of the signage to ensure that the retroreflectivity is maintained during and after installation. To create the proper composition requires a specific composition of the alkyd-based preformed thermoplastic composite which is one embodiment of the present disclosure. In addition, there still exists the need for runway signage that is relatively simple and quick to apply and that exhibits exceptional wear characteristics as well as allowing for delayed intervening scheduled maintenance, thereby assisting with the reduction of the cost of maintenance, delayed flights and confusion due to runway rerouting, and the signage should maintain skid resistance together with the increased retroreflectivity.

AirMark® is an airport runway signage device that comprises an alkyd resin-based preformed thermoplastic which may be laid out in 90'×120' sections onto airport runways. The original AirMark formula used conventional 1.5 index beads of types I and IV from the table I below:

TABLE I

Glass Bead Gradation
(Percent By Weight, Passing, ASTM D1214)

| U.S. Sieve # | Microns | Type I A | | Type I B | | Type III | | Type IV A | | Type IV B | |
|---|---|---|---|---|---|---|---|---|---|---|---|
| | | Min | Max | Min | Max | Min | Max | Min | Max | Min | Max |
| 12 | 1700 | — | — | — | — | — | — | 100 | — | 100 | — |
| 14 | 1400 | — | — | — | — | — | — | 95 | 100 | — | — |
| 16 | 1180 | — | — | — | — | 100 | — | 80 | 95 | 95 | 100 |
| 18 | 1000 | — | — | — | — | — | — | 10 | 40 | — | — |
| 20 | 850 | 100 | — | — | — | 95 | 100 | 0 | 5 | 35 | 70 |
| 30 | 600 | 80 | 100 | — | — | 55 | 75 | — | — | 0 | 5 |
| 40 | 425 | — | — | — | — | 15 | 35 | — | — | — | — |
| 50 | 300 | 18 | 35 | — | — | 0 | 5 | — | — | — | — |
| 70 | 212 | — | — | 100 | — | — | — | — | — | — | — |
| 80 | 180 | — | — | 85 | 100 | — | — | — | — | — | — |
| 100 | 150 | 0 | 10 | — | — | — | — | — | — | — | — |
| 140 | 106 | — | — | 15 | 55 | — | — | — | — | — | — |
| 200 | 75 | 0 | 2 | — | — | — | — | — | — | — | — |
| 230 | 63 | — | — | 0 | 10 | — | — | — | — | — | — |

Table 1 above is from the Federal Aviation Administration's TT-B-1325D Federal Specification regarding the use of glass beads with pavement marking. The specification below indicates the both the bead type and correspondence with the features of each bead type. To comply with the specification, the percent of beads passed through the specified sieve should be in the stated in the table limits.

The FAA TT-B-1325D Test Bead Categorization is as follows:
Type I—Low Index of Refraction recycled glass (fire-polished process)
  Gradation A (Coarse, Drop-on)
  Gradation B (Fine, Premix)
Type III—High Index of Refraction
Type IV—Low Index of Refraction direct melt glass (molten glass kiln process)
  Gradation A (Large Coarse, Drop-on)
  Gradation B (Medium Coarse, Drop-on)

The density of these (low index of refraction) beads is near or about 2.6 grams per cubic centimeter. This "first generation" AirMark® produced white retroreflectivity in the 100-200 mcd range, essentially an order of magnitude below the standard required and reached by use of the new composite described herewithin.

Initially, the high index of refraction (1.9) glass beads (Type III) were provided in the original AirMark formulation and used as drop-on beads. The very surprising result is that less retroreflectivity than the conventional 1.5 index beads occurred (less than 100 mcd). It was discovered that these higher reflectivity beads sank faster in the performed thermoplastic composite due to their higher density (approximately 4 grams per cubic centimeter). The need to use these higher retroreflectivity beads, however, remains.

As with the original AirMark®, this new composite may also be initially rolled and then melted onto the runway surface using an 8 foot to 16 foot wide IR heater. Hand held propane torches may also be used, such as the Flint 2000EX, available from Flint Trading, Inc. The material thickness of this runway signage is nominally 0.060 inches. The signage without high retroreflectivity and anti-skid properties has a backing that is relatively thin and flexible and normally utilizes a relatively low viscosity (50-500 centipoise—cps) two component primer, such as an epoxy primer.

An embodiment of the present disclosure, however, requires the need and use of a two part epoxy primer which is nominally in the narrow viscosity range of 50-500 cps at room temperature for ensuring proper and optimal bonding to a runway or taxiway surface. Lower or higher viscosity epoxy primers do not work well for the present disclosure and associated invention due to the change in the functional composition/composite of the runway/taxiway signage. This composition/composite is described, in detail, below;

Specifically, a further embodiment requires that the composition of the preformed thermoplastic sheets must include TT-B 1325D Type III glass beads comprised of a barium-based glass chemistry such as those sold by Potters Industries, Inc. with a particle size distribution of between 300 and 1180 microns and exhibiting a density in the range of 3.5-4.5 gm/cc and an index of refraction of 1.9, within a preformed thermoplastic resin that incorporates the use of a functionalized wax, such as an oxidized microcrystalline wax or a maleic anhydride functionalized wax, or an acrylic acid copolymer with a weight average molecular weight of less than 10,000. An example of an ethylene maleic anhydride copolymer wax is sold by Honeywell Corporation under the tradename of AC 575. It is incorporated in the range of 0.2-3.0 percent by weight of the preformed thermoplastic resin. The wax provides stability of the viscosity of the preformed thermoplastic over a substantially wide temperature range (120-200° C.) as opposed to compositions not including the use of such waxes (FIG. 2). The glass beads must be suspended in the preformed thermoplastic resin and also there must be an allowance for spreading the same beads onto the surface during the application of the signage to the surface. These beads must not sink into the preformed thermoplastic during heating and application in order to maintain a retroreflectivity of at or about 1000 millicandellas/$m^2$/lux (mcd). This retroreflectivity light intensity measurement has been required for most new airport installations in our effort to enhance safety. These beads have been known in the art but have seen limited application due to their higher cost and the fact that they scratch easily and do not hold up to high average daily traffic (ADT) when used with painted or other surface indicia. Use of the beads together with the preformed thermoplastics (either mixed into the resin composition or spread across the surface during installation) has not been known or used prior to this disclosure A preferred embodiment is that the functionalized wax be used in a range of 0.3 to 0.5 percent by weight of the preformed thermoplastic resin.

An additional embodiment provides for a preformed thermoplastic is an alkyd resin-based pre-manufactured thermoplastic airport runway signage that is laid out in relatively large sections onto an airport runway. The preformed thermoplastic is initially formed as a continuous sheet and wound onto a take-up spool. To acquire the reflective properties necessary, glass beads with specific sizes such as described in the Federal Aviation Administration (FAA) document TT-B-1325 D, issued Jun. 1, 1993, are both embedded within the sheet and also strategically placed over the sheet during the heating and installation procedure which is described in the next paragraph.

In addition to retroreflectivity, skid resistance, which in this case is defined as the raising of the surface friction coefficient of the preformed thermoplastic indicia layer onto the runway/taxiway to prevent slippage of airport personnel, must also be increased. During moist or wet weather conditions, there have been worker accidents attributed to slick painted indicia as well as for preformed thermoplastic AirMark® signage. Use of anti-skid materials within the preformed thermoplastic sheets including corundum, quartz, sand, etc., all of which are used to increase the coefficient of friction, but must be achieved within the set of parameters as described above, namely the preformed thermoplastic sheets in the molten state, must exhibit a viscosity of between 35,000 and 85,000 cps during installation. This molten state is normally achieved at or about 150 degrees Centigrade or generally above 300 degrees Fahrenheit, and with the incorporation of the anti-skid materials, optimization of the viscosity is more difficult to achieve. A lower viscosity composite will allow the glass beads to sink and thereby greatly diminish or eliminate retroreflectivity intensity, while a higher viscosity preformed thermoplastic will not sufficiently bond with the runway/taxiway surface.

The runway surface is prepared with the two-part epoxy primer and the preformed thermoplastic is unwound from the take-up spool and positioned onto the runway surface. When the preformed thermoplastic signage is in a desired location it is initially rolled conforming to the runway surface. Heat is applied to the rolled surface to a temperature of or about 300° F. degrees with this particular preformed plastic sheet composition. Fusing with a wide infra-red (IR) heater to melt the preformed thermoplastic signage into the runway surface allows for adhering the preformed thermoplastic signage to the runway surface.

The modified formulation and resulting composition of the present disclosure increases the viscosity of the preformed thermoplastic in order to retard bead sinking. Non-conventional two-part epoxy sealers were necessary (within a narrow–50-500 cps range at room temperature) were required so that optimal bonding together with optimal retroretroreflectivity could be obtained.

In an additional embodiment the pre-manufactured thermoplastic signage is flexible and the material thickness is in a range of 0.050 inches-0.075 inches with a nominal thickness of 0.060".

Additionally the pre-manufactured thermoplastic signage that is manufactured may be shipped as 90 foot×120 foot sections composed of individual 3 foot×2 foot sheets of material.

Another embodiment includes the ability of the large pre-manufactured thermoplastic signage to be installed quickly and easily to concrete or asphalt surfaces.

In another embodiment the pre-manufactured thermoplastic signage may also be applied to fresh asphalt surfaces as soon as the asphalt has cured to a "set".

An additional embodiment includes the fact that the pre-manufactured thermoplastic signage may have features such as indents, bumps or marks that are visible indicators such that correct adhesion temperature are attained by the infra-red or other heating means used by those skilled in the art.

In an additional embodiment, the pre-manufactured thermoplastic signage is an alkyd thermoplastic product with the addition of a polyurethane composition for flexibility and impact resistance. The polyurethane can be aliphatic or aromatic in combination with either polyester or polyether functionality. The polyurethane must have a suitable viscosity to be used with a typical range at 190° C. which provides a viscosity of between 46 Pa·s to 120.9 Pa·s (46,000 cps to 120,900 cps).

In another embodiment the pre-manufactured thermoplastic signage is prepared to meet specific lengths and widths conforming with FAA Standards AC 150/5340-1 "Standards for Airport Indicia" and AC 150/5340-18 "Standards for Airport Sign Systems" for touchdown indicia, threshold indicia configurations, aiming point indicia and centerlines, as requirements for precision instrument runways.

In yet another embodiment the pre-manufactured thermoplastic signage is provided as alpha-numeric symbols for specific information signage that is applied to the runway, taxiway or holding surface.

In another embodiment the pre-manufactured thermoplastic signage is available in various colors or hues.

In another embodiment the pre-manufactured thermoplastic signage has features that allow the edges to physically interconnect and interlock.

An embodiment of the disclosure is that the pre-manufactured thermoplastic signage is available for traffic within minutes of adhering the specific signage.

Additionally as another embodiment, the pre-manufactured thermoplastic signage identifies areas for aircraft support vehicles or outdoor passenger loading in non-runway areas.

An additional embodiment for the pre-manufactured thermoplastic signage identifies specific helicopter landing and takeoff areas including medical transport.

DETAILED DESCRIPTION OF THE DRAWINGS

Figure 1:
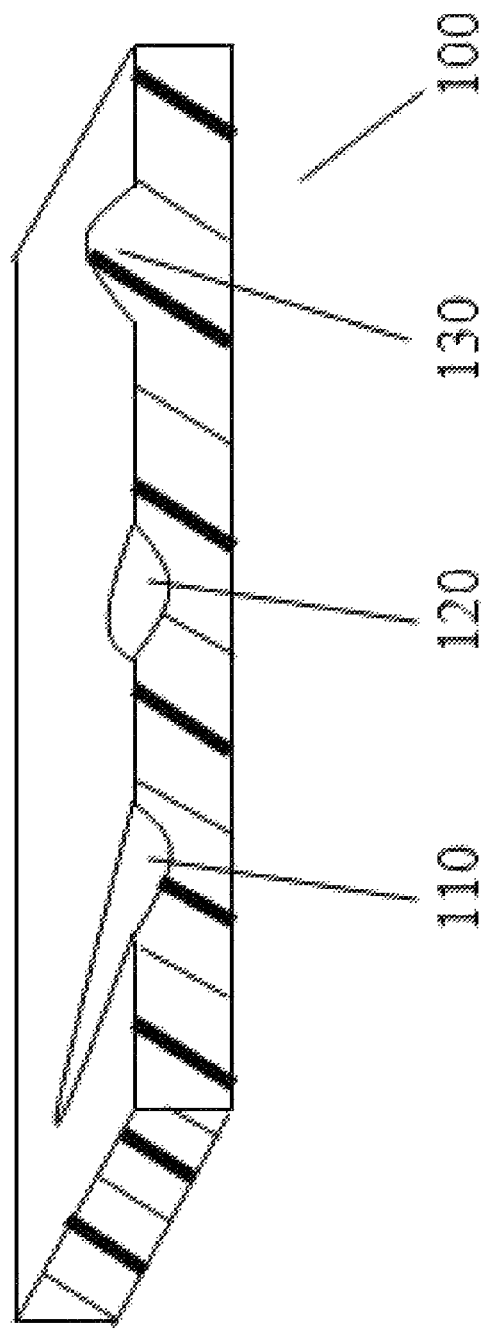
FIG. 1 is an isometric cross-section of the pre-manufactured thermoplastic signage with optional temperature indicating features.

FIG. 1 is an isometric cross section of the thermoplastic signage [100] with temperature indicating feature such as, but not limited to, an indent [110], a dimple [120] or a bump [130] or any other heat deformable marker that visibly deforms when heating elevates the temperature of the thermoplastic signage [100] to a desired temperature. When the desired temperature is reached the temperature indicating feature [110, 120, 130] visibly reforms becoming a blended surface according to the traffic surface shape to which it applied. Adhesive [140] is relatively thin and flexible and utilizes a low viscosity (50-500 cP) polyurea epoxy primer such as is available from ChemCo Systems.

Figure 2:
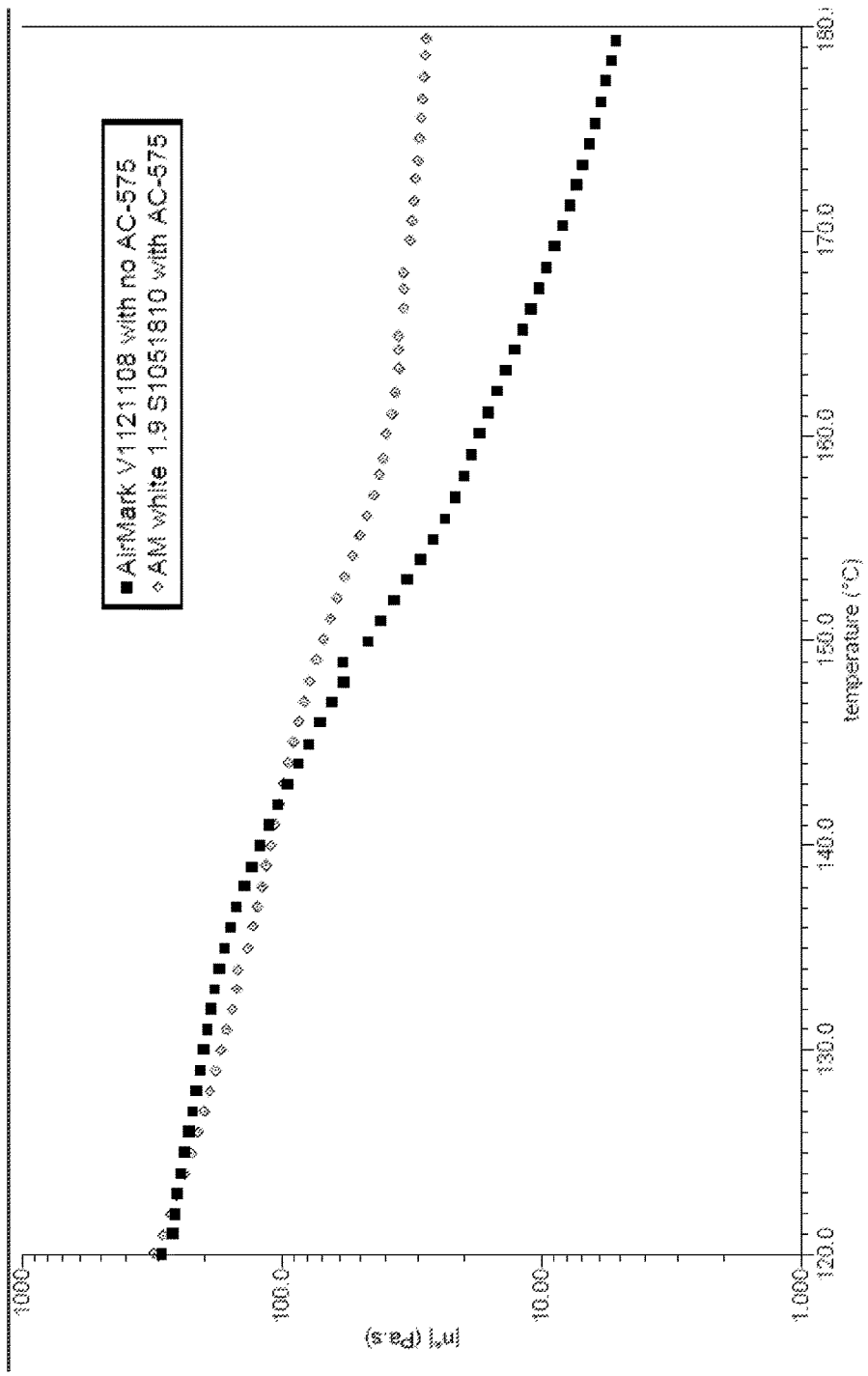
FIG. 2 is a graphical presentation of the stability of the viscosity of the preformed thermoplastic incorporating a functionalized wax of acrylic acid copolymer, as opposed to compositions not including the use of such waxes.

FIG. 2 is a graphical presentation of the stability of the viscosity of the preformed thermoplastic incorporating a functionalized wax of acrylic acid copolymer, for example AC-575, over a substantially wide temperature range (120-200° C.) as opposed to compositions not including the use of such waxes. The viscosity of AirMark V121108 with no AC-575 is shown to be substantially less stable at higher temperatures than the viscosity of AM white 1.9 S1051810 with AC-575.

What is claimed is:

1. A method for adhering large surfaces of thermoplastic signage to a suitable aviation substrate comprising: an alkyd or hydrocarbon resin-based composite wherein said signage comprises a bottom surface and a top surface and edges that surround the perimeter of and are attached to said bottom surface and said top surface, wherein said bottom surface is covered with a two-part sealer treatment; said sealer treatment provided within a viscosity range of between 50 and 500 centipoise for bonding of said alkyd or hydrocarbon resin based composite to said aviation substrate, wherein said composite comprises a functionalized wax incorporated in said resin-based composite within the range of 0.2 to 3 percent by weight of the resin, thereby allowing said resin-based composite to exist in a molten state within a viscosity range of between 35,000 and 85,000 centipoise and wherein said top surface comprises retroreflective glass beads, wherein said glass beads are within a particle size distribution of between 300 and 1180 microns and within a density range of 3.5 to 4.5 grams per cubic centimeter, and wherein said beads exhibit an index of refraction of 1.9 such that when said beads are suspended in and applied on the surface of said resin-based composite in said molten state such that said beads allow for maintaining an overall retroreflectivity of about 1000 millicandellas/m$^2$/lux (mcd), and wherein said resin-based composite is forming a continuous sheet wound onto a take-up spool and wherein said resin-based composite is subsequently unwound providing positioning and conformity to said aviation substrates and subsequently heating said signage to a predetermined temperature providing adhesion of said resin-based composite to said aviation substrate; and wherein said signage comprises features allowing said edges of said signage to physically interconnect and interlock with edges of other signage with the same or other features allowing for winding or unwinding of said continuous sheet from spools for specific transportation and site placement.

2. A method for adhering a large surface of thermoplastic composite signage to a substrate comprising:
 obtaining a thermoplastic composite comprising a functionalized wax and one or more anti-skid materials, wherein the functionalized wax has a weight average molecular weight of less than 10,000 and wherein the composite forms a continuous sheet wound onto a take-up spool;
obtaining a two-part epoxy primer having a viscosity of between 50 and 500 centipoise at room temperature:
applying the two-part epoxy primer to the substrate:
unwinding the thermoplastic composite;
positioning the thermoplastic composite on the substrate;
heating the thermoplastic composite to adhere the thermoplastic composite to the substrate, wherein the composite is heated to a molten state having a viscosity range of between 35,000 and 85,000 centipoise at 150° C.; and
adding a top coating of retroreflective glass beads onto the heated thermoplastic to impart retroreflectivity to the signage,
wherein the glass beads have a particle size distribution of between 300 and 1180 microns, and wherein the signage is suitable for an aviation substrate.

3. The method of claim 2, wherein the glass beads are positioned within the thermoplastic at a depth wherein the glass beads impart a retroreflectivity of at least 1000 millicandellas/m$^2$/lux (mcd).

4. The method of claim 2, wherein the glass beads have an index of refraction of 1.9.

5. The method of claim 2, wherein the thermoplastic composite is heated to a temperature of about 300-400° F.

6. The method of claim 2, wherein the thermoplastic signage comprises one or more edge features configured to interconnect and interlock with an adjacent signage comprising one or more complementary edge features, and
wherein the positioning the thermoplastic composite on the substrate comprises physically interconnecting and interlocking the one or more edge features of the thermoplastic signage with the one or more complementary edge features of the adjacent signage.

7. The method of claim 2, wherein the thermoplastic composite comprises an alkyd-based thermoplastic composition comprising polyurethane.

8. The method of claim 7, wherein the polyurethane is aliphatic or aromatic with polyether or polyester functionality.

9. The method of claim 2, wherein the thermoplastic composite comprises edge features capable of interconnecting or interlocking with adjacent signage to provide positioning and conformity for adhering the signage to the substrate.

10. The method of claim 9, wherein the thermoplastic composite comprises one or more temperature indicating features on a top surface of the composite to provide visible indication for heating the thermoplastic composite.

11. The method of claim 10, wherein the temperature indicating features comprise a dimple, a dent, or a bump that visibly deforms at a temperature of at least 300° F.

12. The method of claim 2, wherein the anti-skid materials comprise corundum, quartz, or sand.

13. The method of claim 2, wherein the thermoplastic composite has a thickness range of from 0.050 inches to 0.075 inches.

14. The method of claim 2, wherein the substrate is a runway, holding position, or taxiway surface.

15. The method of claim 2, wherein the substrate is asphalt or concrete.

16. A method for adhering large surfaces of thermoplastic signage to a suitable aviation substrate comprising:
obtaining an alkyd or hydrocarbon resin-based composite, wherein the composite forms a continuous sheet wound onto a take-up spool;
unwinding the composite to provide positioning and conformity to the substrate; and
heating the composite to a predetermined temperature to adhere the composite to the substrate,
wherein the composite comprises a bottom surface and a top surface and edges that surround the perimeter of and are attached to the bottom surface and the top surface,
wherein the bottom surface is covered with a two-part sealer treatment having a viscosity range of between 50 and 500 centipoise to bond the composite to the substrate,
wherein the composite comprises a functionalized wax incorporated in the composite within the range of 0.2 to 3 weight percent of the resin,
wherein the functionalized wax has a weight average molecular weight of less than 10,000,
wherein the composite has a viscosity range of between 35,000 and 85,000 centipoise in a molten state, and
wherein the top surface comprises retroreflective glass beads,
wherein the glass beads have a particle size distribution of between 300 and 1180 microns and a density range of 3.5 to 4.5 grams per cubic centimeter, and
wherein the beads exhibit an index of refraction of 1.9 and allow for maintaining an overall retroreflectivity of about 1000 millicandellas/m$^2$/lux (mcd), and
wherein the signage comprises features allowing the edges of the signage to physically interconnect and interlock with edges of other signage with the same or other features allowing for winding or unwinding of the continuous sheet from spools for specific transportation and site placement.

17. The method of claim 2, wherein the functionalized wax comprises an oxidized microcrystalline wax, a maleic anhydride functionalized wax, or an acrylic acid copolymer.

* * * * *